United States Patent

[11] 3,587,354

| [72] | Inventors | Tomio Oguma<br>Iruma-Gun;<br>Sadanori Nishimura, Tokyo; Tadaatsu<br>Satomi, Tokorozawa-shi, Japan |
|---|---|---|
| [21] | Appl. No. | 845,324 |
| [22] | Filed | July 28, 1969 |
| [45] | Patented | June 28, 1971 |
| [32] | Priority | July 31, 1968 |
| [33] | | Japan |
| [31] | | 43/53653 |

[54] CHANGE-SPEED CHARACTERISTIC CONTROL APPARATUS IN AUTOMATIC TRANSMISSION APPARATUS FOR VEHICLE
7 Claims, 4 Drawing Figs.

[52] U.S. Cl. .................................................. 74/868, 137/625.3
[51] Int. Cl. .................................................. B60k 21/00, F16k 25/00
[50] Field of Search ................................. 74/868, 869; 137/625.3, 74.6; 74/865, 867

[56] References Cited
UNITED STATES PATENTS

| 3,147,635 | 9/1964 | Fisher | 74/868 |
| 3,383,956 | 5/1968 | Chang | 74/868 |
| 3,398,607 | 8/1968 | Chana | 74/868X |
| 3,438,285 | 4/1969 | Hahfi et al. | 74/869 |
| 3,466,950 | 9/1969 | Mummert | 74/868 |

Primary Examiner—Arthur T. McKeon
Attorney—Waters, Roditi, Schwarz & Nissen

ABSTRACT: A change-speed characteristic control apparatus which includes, for low- and high-speed friction clutches, a shift valve; and, coupled to the shift valve, a throttle pressure detector and a governor detector. The throttle pressure detector is provided with two springs to give a change-speed characteristic with two degrees of slope.

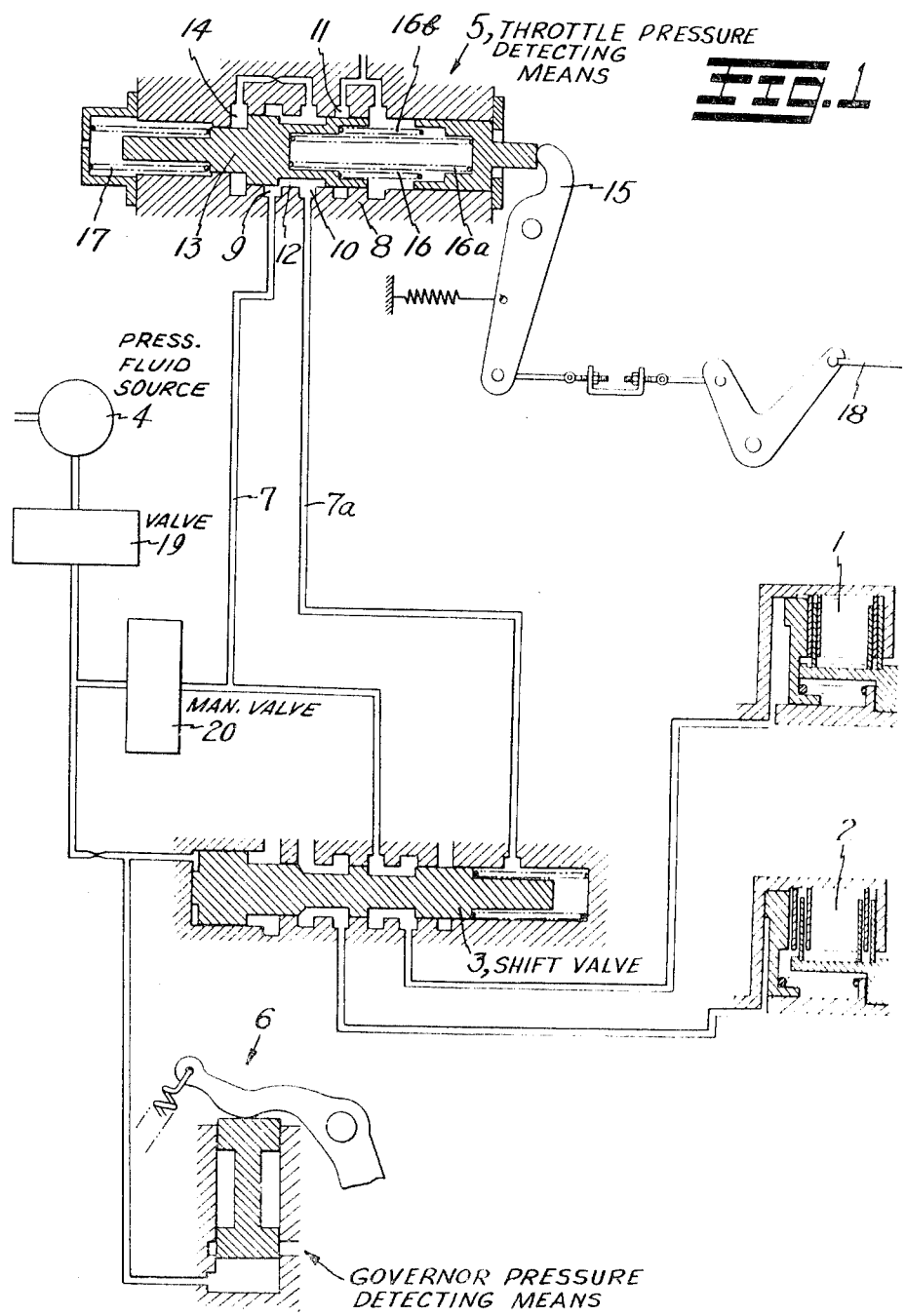

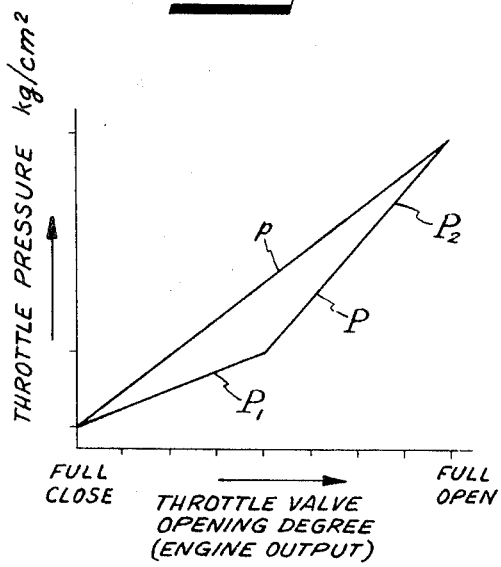
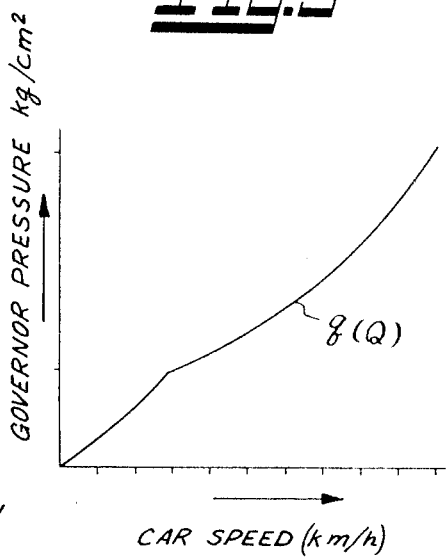
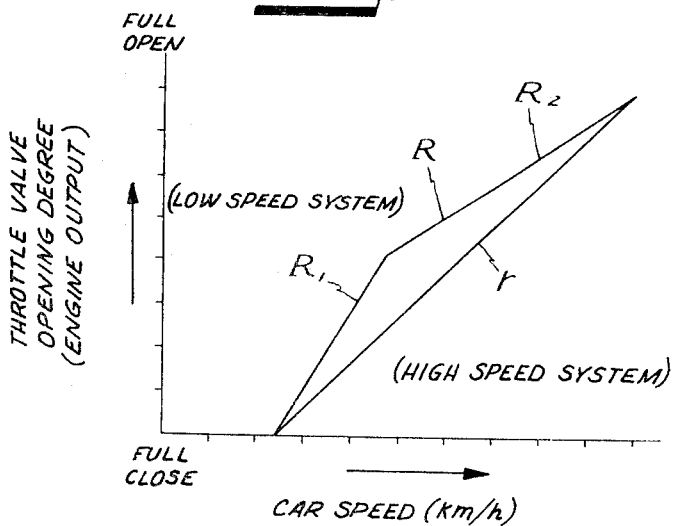

CHANGE-SPEED CHARACTERISTIC CONTROL APPARATUS IN AUTOMATIC TRANSMISSION APPARATUS FOR VEHICLE

DETAILED EXPLANATION OF THE INVENTION

A type of automatic transmission apparatus has been hitherto known for vehicles such as motor cars wherein a throttle pressure such as an oil pressure corresponding to the degree of opening of an engine throttle valve, and accordingly corresponding to the engine output power, and a governor pressure such as an oil pressure corresponding to car speed are arranged to act differentially on a shift valve for automatically selecting a low-speed transmission system or a high-speed transmission system.

In this kind of apparatus, hitherto, the throttle pressure and the governor pressure both make a substantially linear change as shown by line $p$ of FIG. 2 and line $q$ of FIG. 3. Thus, the change of the operating point of the shift valve, that is, the change of the change speed point for shifting, for example, from the low-speed transmission system to the high-speed transmission system, is substantially linear as shown by line $r$ of FIg. 4. However, a linear change of the change speed characteristic is not always favorable and there is a requirement that the same should be modified, for example, as shown by line R of FIG. 4. Specifically, there is a requirement, for example, that the change speed point be deflected toward the comparatively lower speed side near the half opening range of the engine throttle valve.

This invention has as an object the provision of an apparatus satisfying this requirement and which is characterized in that, for an automatic transmission apparatus for vehicles, a throttle valve corresponding to engine output power and governor pressure corresponding to a car speed are arranged to act differentially, pressurewise, on a shift valve for automatically selecting a low-speed transmission system or a high-speed transmission system. The throttle pressure is arranged to have a change of at least two stages comprising a first stage wherein the pressure increases comparatively gently as the engine output power increases and a second stage wherein the pressure increases comparatively rapidly.

According to another feature of this invention, in the above apparatus, a leakage opening for communicating the interior of a passage connected to a pressure fluid source with the external air is provided with a pressure control valve acting towards its opening side in response to the pressure within said passage and towards its closing side in response to a pressure control spring supported at its rear end by a pressing member advancing in accordance with increase of the engine output power, so that the pressure within said passage is automatically adjusted to be the throttle pressure corresponding to the engine output power. Said pressure control spring is composed of at least two stage springs gradually compressed as the pressing member advances.

An example of this invention will next be explained with reference to the accompanying drawings.

GENERAL EXPLANATION OF DRAWING:

FIG. 1 is a schematic diagram of apparatus in accordance with one embodiment of this invention;

FIG. 2 is a diagram explaining change of a throttle pressure;

FIG. 3 is a diagram explaining change of governor pressure; and

FIG. 4 is a diagram explaining the change speed characteristic.

In the automatic transmission apparatus of FIG. 1, a fluid-pressure-operated low-speed friction clutch 1 interposed in a low-speed transmission system and a fluid-pressure-operated high-speed friction clutch 2 interposed in a high-speed transmission system are connected to a pressure fluid source 4 such as an oil pump or the like through a shift valve 3 responsive to a pressure difference. A throttle-pressure-detecting apparatus 5 for detecting the engine throttle valve degree of opening, that is, the engine output power as a throttle pressure (such as an oil pressure corresponding thereto) and a governor-pressure-detecting apparatus 6 for detecting car speed as a governor pressure (such as an oil pressure corresponding thereto) are connected with the pressure fluid source 4. Thus, the output powers of devices 5 and 6 act differentially on the shift valve 3 for automatically selecting one of the two clutches 1 or 2 and, accordingly, one of the two transmission systems.

It is known for the output characteristic of the throttle-pressure-detecting apparatus 5 to be substantially linear as shown by line $p$ of FIG. 2 and also for that of the governor-pressure-detecting apparatus 6 to be substantially linear as shown by the line $q$ of FIG. 3. In the known arrangement, the change of the operating point of the shift valve 3 caused by the inversion of the difference between the output pressures of the two devices 5 and 6 (that is, relative to the change speed point for switching, for example, from low speed to high speed) is substantially linear as shown by line $r$ of FIG. 4. Such a linear change speed characteristic, however, is not always favorable and, in accordance with the invention, a change speed characteristic such as shown by line R of FIG. 4 is desirable. This requires that the change speed point be deflected toward the lower speed side at the middle of the engine output power or in the vicinity of half opening of the throttle valve.

The invention provides an apparatus satisfying this requirement, and the output characteristic of the throttle-pressure-detecting apparatus 5 is so constructed that it has a change of at least two stages comprising a first stage $P_1$ at which it rises comparatively gently as the throttle opening is increased and a second stage $P_2$ at which it rises comparatively rapidly as shown by line P of FIG. 2. If so arranged, the change speed characteristic thus obtained is one such as shown by line R of FIG. 4 including at least two stages comprising the first stage $R_1$ rising comparatively sharply as the engine output power increases and the second stage $R_2$ rising comparatively gently, whereby the desired requirement can be satisfied.

For obtaining the foregoing characteristic throttle pressure, the throttle-pressure-detecting apparatus 5 is specially constructed. Namely, a valve housing 8 is provided with an inlet opening 9 for a conduit 7 and an outlet opening 10 is provided for conduit 7a. Conduit 7 is in communication with the pressure fluid source 4. The valve housing 8 is provided with a leakage opening 11 open to the external air. A slide valve 13 constructed at the middle portion thereof to form a communicating passage 12 is slidably accommodated in said housing 8. A pressure chamber 14 formed at one end thereof is brought into communication with said passage 12 and the other end of said valve 13 is acted upon by a pressure control spring 16 subjected to pressure at the rear surface thereof by a pressing member 15 advanced in accordance with increase of the throttle opening degree, so that the pressure fluid supplied from the pressure fluid source 4 through the inlet opening 9 partly leaks out from the leakage opening 11 or is taken out from the outlet opening 10 as a pressure fluid corresponding to the throttle opening degree or engine output power.

The pressure control spring 16 is composed of at least two stages including a first spring 16a and a second spring 16b which are gradually compressed as the pressing member 15 advances. The pressure of the pressure fluid obtained at the outlet opening 10 thus comprises at least two stages, as shown by the line P of FIG. 2, including a first stage $P_1$ rising comparatively gently and a second stage $P_2$ rising comparatively rapidly. If, accordingly, the governor pressure is kept substantially linear as the line $q$ (Q) of FIG. 3, the change of the operating point of the shift valve 3 caused by the inversion of the output difference between the two, that is, the change of the change speed point, is obtained in such a manner that the same bends into at least two stages: a first stage $R_1$ rising comparatively rapidly and a second stage $R_2$ rising comparatively gently as shown by the line R of FIG. 4. In other words, there is obtained a characteristic whereby the change speed point is deflected towards the lower speed side at the middle of the engine output power.

In the above apparatus, element 17 is a return spring for the valve 13, and element 18 is a wire for connecting the pressing member 15 with the engine accelerator pedal. Element 19 is a valve for adjusting the pump output, and element 20 is a manually operable change speed valve.

Thus, according to this invention, the change of the change speed point, that is, the change speed characteristic can be formed into any one as desired, for example, into the illustrated one that is deflected toward the lower speed side in the vicinity of half opening of the throttle. According to another feature of this invention, it is sufficient that the pressure control spring be composed of at least two stages in a comparatively simple arrangement.

We claim:

1. A change speed characteristic control for an automatic transmission apparatus for a vehicle having a performance characterized by engine output power and vehicle speed, said control comprising low-speed and high-speed transmission means, pressure-responsive means for selecting one of said transmission means, a pressure source, governor pressure means coupled to said source for producing a pressure corresponding to vehicle speed, and throttle pressure means coupled to said source for producing a pressure output which varies according to engine output power but having two distinct stages in one of which the pressure increases more rapidly in relation to engine output power variation, said throttle pressure means and governor pressure means being connected to said pressure-responsive means to act differentially therein.

2. A control as claimed in claim 1 wherein said throttle pressure means includes a slide valve, two springs acting on said valve, and means to exert a pressure against said valve via both said springs to provide displacement of said valve in said two stages.

3. A control as claimed in claim 2 wherein said throttle pressure means includes a housing having an inlet coupled to said source, an outlet coupled to said pressure-responsive means, and a leakage opening, said slide valve being located in said housing and selectively of coupling the source to said outlet or opening.

4. A control as claimed in claim 3 wherein the vehicle has a throttle controlling engine output power, said control further comprising a pressing member between said throttle and said throttle pressure means controlling the movement of the slide valve through said springs.

5. A control as claimed in claim 4 wherein the springs are arranged so that said two stages are in sequence and so that the more rapid rate of increase of pressure relative to engine output power occurs at higher engine output powers.

6. A control as claimed in claim 5 further comprising a manual control between said source and the inlet of said housing.

7. A control as claimed in claim 6 wherein the low-speed and high-speed transmission means include friction clutches.